United States Patent Office 2,925,347
Patented Feb. 16, 1960

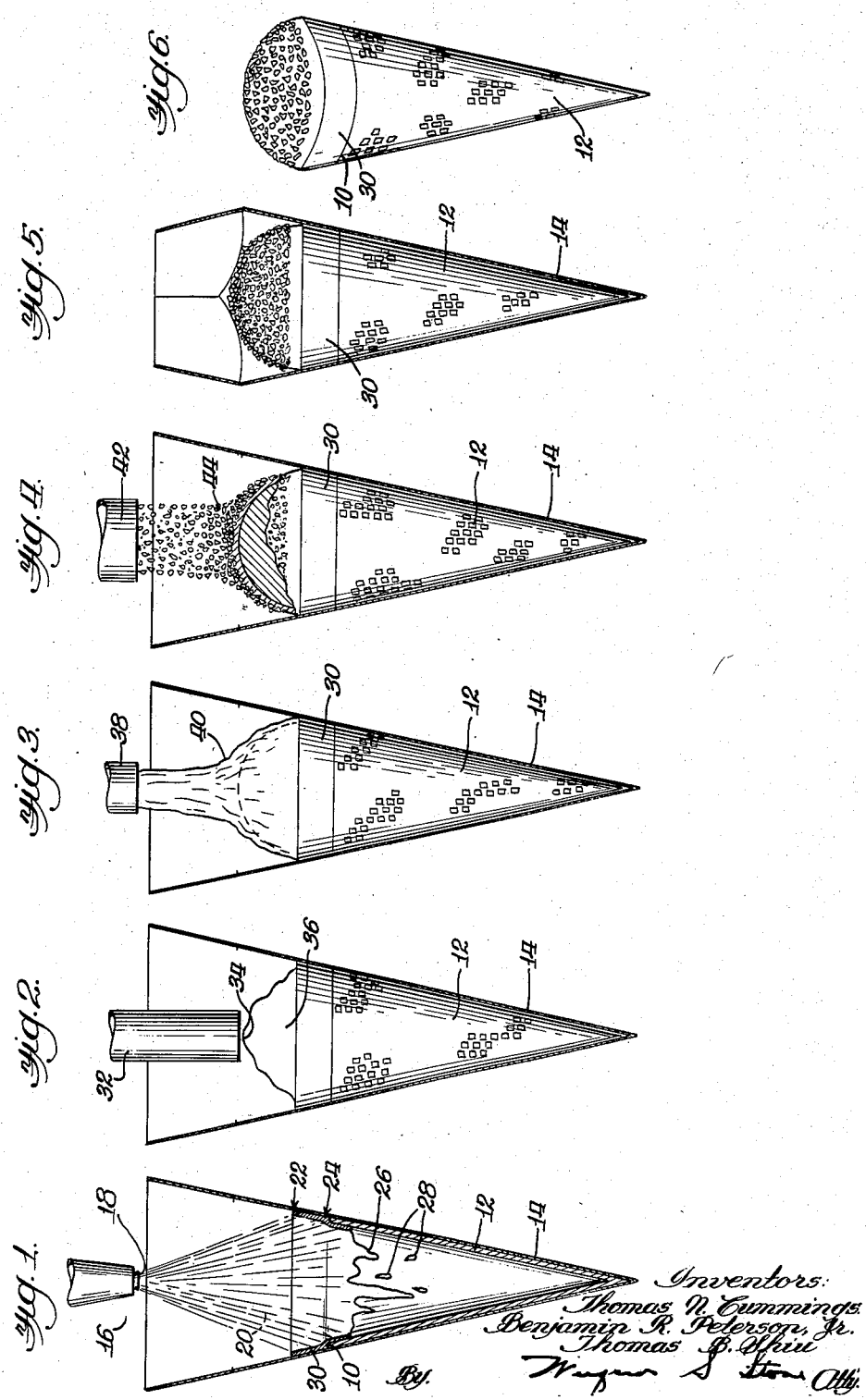

2,925,347
METHOD OF MAKING A WRAPPED ICE CREAM CONE

Thomas N. Cummings, Chicago, Benjamin R. Peterson, Jr., Wheaton, and Thomas B. Shiu, Chicago, Ill., assignors of one-fourth to Nicholas A. Cummings, Chicago, Ill.

Application December 13, 1954, Serial No. 474,684

2 Claims. (Cl. 99—180)

This invention relates to making a packaged chocolate covered ice cream cone. The invention turns upon the discovery that a chocolate in viscous condition can be temporarily held on an almost vertical wall of paper and then brought into contact with ice cream on the side away from the paper, and that upon cooling, the paper can be torn off leaving the chcolate adhering to the ice cream.

Referring to Figure 6, applicants show one of their cones after the wrapper has been removed. This will serve to elucidate the problem. For several years, ice cream manufacturers have been ever increasingly successful in competing with ice cream cones made at the soda fountain by providing a cone which has a chocolate covering over the top. These factory cones are almost as hand made as are the soda fountain cones. An operator supervises the filling so that the ice cream projecting above the rim 10 of the sugar cone 12, referring to Figure 6, is hemispherical. After the cones have been filled, they are locked in a rack, hardened in a cooler, turned upside down, dipped in a vat of chocolate, and then into nuts. The chocolate comes just to the rim 10 or possibly a little below. The ice cream hardens the chocolate. The cone is then placed in a bag, further hardened, and thus packaged, enters the channels of trade.

Mechanizing the manufacture of this type of ice cream cone produces an end product which has a very unsatisfactory appearance. In these processes, a sugar cone is positioned in a paper cone, and filled with ice cream to a point where the ice cream projects well above the rim of the cone. This projection of the ice cream above the cone is an important sales inducement to children. In filling the cone, the ice cream is being extruded at a temperature of 25° F., which means that it is very flowable. There is no way of rounding off the top of the ice cream and there is no way of keeping it from tending to settle into a horizontal place. What is necessary, therefore, is to take the cone from beneath the ice cream nozzle and position it beneath a chocolate nozzle sufficiently rapidly so that the ice cream has not flowed so as to engage the paper above the rim of the sugar cone. As a practical matter, one cannot do this. The viscosity of an ice cream mix depends upon the ingredients and the temperature and while for a given batch, the ingredients may be quite uniform, there are slight variations in temperature as the ice cream comes out of the freezing chamber. A degree or two will alter the rate of settling of the ice cream. Moreover there is pressure upon the operators to keep the ice cream on the liquid or flowable side because this expedites filling.

The result of the method of overfilling the sugar cone and then flowing on a coating of chocolate is occasionally to produce a generally perfect cone such as that shown in Figure 6, but more often, by the time the chocolate is added, the ice cream has reached the whole or part of the paper wall and when the paper is torn off, there is an unattractive band of ice cream, sometimes mixed with chocolate splotches, extending above the rim of the sugar cone. Or, the ice cream is piled in a somewhat cone shape and the chocolate has run down into the inside of the rim of the sugar cone.

Applicants' object is to make ice cream cones of the type shown in Figure 6 rapidly and uniformly. The feature of the invention which accomplishes this end is the spraying of a quantity of chocolate slightly above and slightly below the line of juncture between the rim of the sugar cone and the adjacent paper cone. The chocolate is soft enough to be sprayed but will adhere sufficiently to the wax surface to form a continuous chocolate film. Immediately thereafter, the ice cream is poured in a liquid condition such that it immediately engages this chocolate surface, but does not overflow it. Thereafter, the cone is again placed under a chocolate extruder and the top is covered with chocolate.

These and such other objects as may hereinafter appear are attained in the embodiment of the invention shown in the accompanying drawings, wherein:

Figure 1 is a sectional view of a sugar cone positioned inside one of applicants' paper wrappers with a band of chocolate being sprayed by a conical spray at the junction of the rim of the sugar cone with the paper;

Figure 2 shows the next step, wherein the ice cream has been deposited in the cone;

Figure 3 shows the second addition of chocolate;

Figure 4 shows the addition of nuts;

Figure 5 shows the package after its top has been sealed; and,

Figure 6 shows the finished confection after the paper wrapping has been removed.

Continuing to refer to the drawings, after placing a sugar cone 12 having a rim 10 inside a conical paper container 14, the upwardly open assemblage is positioned beneath a nozzle 16 which is supplied with liquid chocolate and which has an orifice control 18 which with requisite pressure will spray the chocolate 20 in a cone having at the point of impingement on the inside of the cone a height thickness of from one-quarter to one-half inch.

Applicants have not shown the apparatus because its particular design is not important to this invention. It might be said, however, that in this type of equipment, the ice cream advances step by step from one operating station to the next operating station and the total time consumed at one station may be a second or even less. All of the operating nozzles are fixed slightly above the rim of the paper container excepting the ice cream nozzle which is lowered into the container. The spray from the nozzle 16 in Figure 1 resembles a sort of spurt or proof of chocolate which takes a part of a second and places the chocolate primarily between the points 22 and 24. This point of spraying may be varied as required. The viscosity of the chocolate varies with its temperature and composition. The more viscous the chocolate, the less likely it is to run down the side wall of the cone and hence if the time interval between the stage shown in Figure 1 and that shown in Figure 2 is less than enough to assure the chocolate completely covering the wall of the paper container 14 below the level 22, the orifice member 18 should be adjusted so that the shot of chocolate will hit closer to the rim 10 or even including the rim and below it.

What happens when this sort of chocolate hits the wall of the paper is generally the wetting of the entire surface and a rather uniform draining down the paper to the rim, over the rim, and on into the cone. When the apparatus is working well, the appearance of the lower edge of the chocolate may very well look like the ragged edge 26 indicating that the chocolate has flowed irregularly down over the rim and reached the edge 26, at which time it had reached the ice cream filling station shown in Figure 2. The dots 28 are drops of chocolate which are a result of the spray. The chocolate in the band 30 need not be thick. Chocolate is very opaque. If the total chocolate delivered by the shot from the nozzle 16 would be sufficient to provide a chocolate band 30 having the cross section shown, the thickness of the chocolate would vary in the band from a thin thickness to a thickness ten times as great. But from the standpoint of adhering to the ice cream and forming a uniform chocolate coating, the thin section will be opaque and will give just as nice an appearance as one ten times as thick.

The next step is to move the sugar cone and wrapper beneath the ice cream extruding nozzle 32, see Figure 2. The ice cream is extruded at a temperature such that the crown or plateau 34 will slowly tend to level off. The final form depends upon the diameter of the nozzle and the preciseness with which the stream is terminated. The ice cream is indicated by the numeral 36 and in Figure 2, the extrusion has terminated and the nozzle 32 is about to be withdrawn.

The ice cream cone and wrapper is then moved to a third station where the third step is performed. This is the simple step of extruding from the nozzle 38 a chocolate coating 40 for covering the top of the ice cream. This step concludes applicants' process so far as this invention is concerned. The band of chocolate 30 had a hardened top edge at the time that the second coating of chocolate was added. This edge does not lie in a plane although it is so shown in the drawings. The spray nozzle 16 of Figure 1 creates some splashing. It follows that there is a line of division between the chocolate band and what applicants call the chocolate cap. Its irregularity is undoubtedly helpful in preventing the two from separating from each other when the paper cone is released.

The remaining figures are steps which illustrate how applicants' product reaches its commercial, salable form. In Figure 4, the coated ice cream cone, preferably before the chocolate has completely hardened, is positioned under a nozzle 42 which drops a charge of crushed nuts 44 upon the chocolate cap. Usually this can be done quickly enough so that the nuts embed themselves in the soft chocolate.

In Figure 5, applicants show an ice cream cone after its top has been sealed in accordance with copending application Serial No. 470,926, filed August 23, 1955, by applicants.

Upon removing the wrapper, the chocolate does not adhere to the paper. Applicants have experimented with various types of paper and find that their product is successful for any paper that is waxed and in general for any paper that is glazed. The reason for this probably is that the temperature of the sugar cone and the paper cone at the time of performing the first step in Figure 1 is substantially room temperature. The chocolate has been developed so that it will be quite liquid at that temperature. When the ice cream is added in the second step, there is a temperature differential of about 40 degrees to 50 degrees, and it is likely that there is a surface melting of the ice cream which causes a penetration of the chocolate into the ice cream which is instantly terminated by a substantial freezing of the chocolate. The chocolate is hard at a temperature of 40 degrees. The result is that there is an interlocking of chocolate and ice cream at the abutting surface of the two which is rough, and tends to give the chocolate a grip on the ice cream. On the other hand, the surface of the paper is comparatively smooth and no true gripping is attained.

Having thus described their invention, what applicants claim is:

1. The method of making a wrapped conical confection which comprises the steps of seating an edible cone in a deeper conical wrapper, of placing a thin band of a selected confection around the interior of the wrapper above the rim of the edible cone, and of filling the edible cone with a confection to a level above the rim.

2. The method of making a wrapped conical confection which comprises the steps of seating an edible cone in a deeper conical wrapper, of spraying a thin band of liquid chocolate around the interior of the wrapper above the rim of the edible cone, and of filling the edible cone to a level above the rim.

References Cited in the file of this patent

UNITED STATES PATENTS

| | | |
|---|---|---|
| 1,313,793 | Dalton | Aug. 19, 1919 |
| 1,475,579 | Harlan | Nov. 27, 1923 |
| 1,968,183 | Vogt | July 31, 1934 |
| 2,108,418 | Thomas | Feb. 15, 1938 |
| 2,289,326 | Howser | July 7, 1942 |
| 2,486,194 | Moser | Oct. 25, 1949 |